(12) United States Patent
Mizuno

(10) Patent No.: US 10,126,640 B2
(45) Date of Patent: Nov. 13, 2018

(54) HEADLIGHT CONTROL APPARATUS FOR PERFORMING CONTROL OF A HEADLIGHT DEVICE

(71) Applicant: DENSO CORPORATION, Kariya, Aichi-pref. (JP)

(72) Inventor: Ryu Mizuno, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/304,820

(22) PCT Filed: Feb. 27, 2015

(86) PCT No.: PCT/JP2015/055923
§ 371 (c)(1),
(2) Date: Oct. 17, 2016

(87) PCT Pub. No.: WO2015/159599
PCT Pub. Date: Oct. 22, 2015

(65) Prior Publication Data
US 2017/0043705 A1 Feb. 16, 2017

(30) Foreign Application Priority Data

Apr. 18, 2014 (JP) ................................ 2014-086494

(51) Int. Cl.
*G03B 21/00* (2006.01)
*G03B 29/00* (2006.01)
(Continued)

(52) U.S. Cl.
CPC ............. *G03B 29/00* (2013.01); *B60Q 1/143* (2013.01); *B60Q 1/16* (2013.01); *F21S 41/162* (2018.01);
(Continued)

(58) Field of Classification Search
CPC .... B60Q 1/143; B60Q 1/16; B60Q 2300/054; B60Q 2300/112; B60Q 2300/114;
(Continued)

(56) References Cited

U.S. PATENT DOCUMENTS

| 2008/0198372 A1* | 8/2008 | Pan ......................... B60Q 1/38 356/121 |
| 2012/0044090 A1 | 2/2012 | Kahler |
| 2017/0144591 A1* | 5/2017 | Yatsu ....................... B60Q 1/04 |

FOREIGN PATENT DOCUMENTS

| JP | 2004-136838 A | 5/2004 |
| JP | 2008-143505 A | 6/2008 |

(Continued)

*Primary Examiner* — Sultan Chowdhury
*Assistant Examiner* — Magda Cruz
(74) *Attorney, Agent, or Firm* — Knobbe, Martens, Olson & Bear, LLP

(57) ABSTRACT

A headlight control apparatus (1) for performing control on a headlight device (7) which includes a pair of headlight units (3, 5) each including a light source (9) and an image forming section (16R, 16G, 16B) capable of forming an image and disposed in a light path of light from the light source to illuminate light (101, 105) for projecting the image onto a road surface, wherein the headlight control apparatus forms the image in the image forming section such that a first image (103) projected onto the road surface by one of the headlight units includes a second image (107) projected onto the road surface by the other headlight unit.

4 Claims, 2 Drawing Sheets

(51) Int. Cl.
 B60Q 1/16      (2006.01)
 B60Q 1/14      (2006.01)
 F21S 41/162    (2018.01)
 F21S 41/17     (2018.01)
 F21S 41/20     (2018.01)
 F21S 41/25     (2018.01)
 F21S 41/64     (2018.01)

(52) U.S. Cl.
 CPC ............... *F21S 41/17* (2018.01); *F21S 41/25* (2018.01); *F21S 41/285* (2018.01); *F21S 41/645* (2018.01); *B60Q 2300/054* (2013.01); *B60Q 2300/112* (2013.01); *B60Q 2300/114* (2013.01); *B60Q 2300/132* (2013.01); *B60Q 2300/312* (2013.01); *B60Q 2300/322* (2013.01); *B60Q 2300/324* (2013.01); *B60Q 2300/45* (2013.01); *B60Q 2400/50* (2013.01); *G03B 21/006* (2013.01)

(58) Field of Classification Search
 CPC ........ B60Q 2300/132; B60Q 2300/312; B60Q 2300/322; B60Q 2300/324; B60Q 2300/45; B60Q 2400/50; F21S 48/1168; F21S 48/1186; F21S 48/1225; F21S 48/125; F21S 48/1731; G03B 21/006
 See application file for complete search history.

(56)  References Cited

FOREIGN PATENT DOCUMENTS

| | | |
|---|---|---|
| JP | 2008-201407 A | 9/2008 |
| JP | 2014-189198 A | 10/2014 |

\* cited by examiner

FIG.2A    FIG.2B    FIG.2C
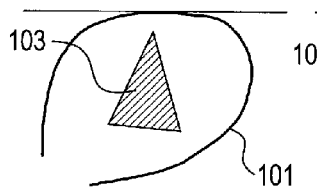 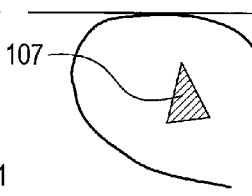 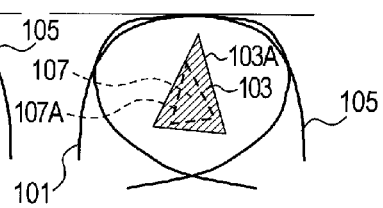
FIG.3A    FIG.3B    FIG.3C
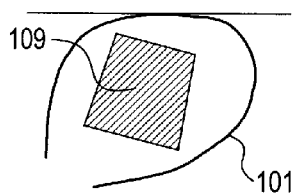 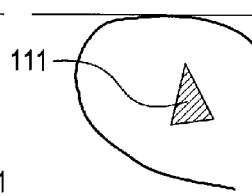 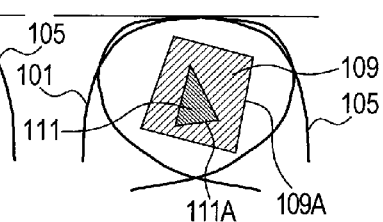
FIG.4A    FIG.4B    FIG.4C
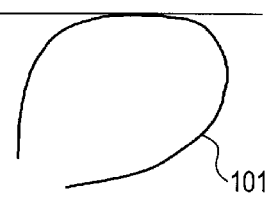 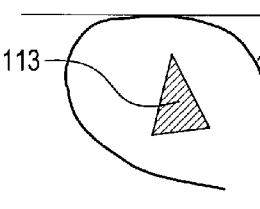 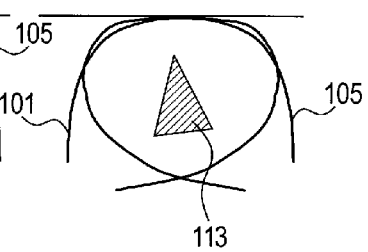

HEADLIGHT CONTROL APPARATUS FOR PERFORMING CONTROL OF A HEADLIGHT DEVICE

TECHNICAL FIELD

The present invention relates to a headlight control apparatus.

BACKGROUND ART

As a vehicle headlight device, there is known a projector type. This headlight device is provided with a liquid crystal panel capable of forming an image in an optical path of the light from a light source, for example, and projects the light passing through the liquid crystal panel in front of a vehicle through a lens. As a result, the image formed on the liquid crystal panel is projected onto a road surface (refer to patent literature 1).

CITATION LIST

Patent Literature

[PTL1] Japanese Patent Application Laid-open No. 2008-143505

SUMMARY OF INVENTION

Technical Problem

Generally, since vehicles are provided with a pair of left and right headlights, it is assumed that the same images are projected at the same position on a road surface by the lights of both the headlights. However, the images projected onto the road surface are extended in specific directions for the respective headlights due to a distortion or a slope of the road surface, or a difference in illumination distance between the respective headlights. Accordingly, even if it is desired to project the same images to the same position on the road surface by the pair of the headlights, since the image projected by one of the headlights and the image projected by the other headlight are displaced from each other, it becomes difficult to recognize the image.

The present invention has been made in view of the above point, and the purpose thereof is to provide a headlight control apparatus capable of solving the above described problem.

Solution to Problem

A first headlight control apparatus of the present invention performs control on a headlight device which includes a pair of headlight units each including a light source and an image forming section disposed in an optical path of a light from the light source and capable of forming an image, and illuminates a road surface by projecting light forming an image.

Further, the first headlight control apparatus of the present invention forms an image in the image forming section such that a first image projected onto the road surface by one of the headlight units includes a second image projected onto the road surface by the other headlight unit.

According to the first headlight control apparatus of the present invention, since the first image includes the second image on the road surface, a boundary line separating between the inside and the outside of the first image and a boundary line separating between the inside and the outside of the second image do not cross each other. Accordingly, a user can easily recognize the first image or the second image projected onto the road surface.

The second headlight control apparatus of the present invention performs control on a headlight device including a pair of headlight units for illuminating a light from a light source onto a road surface. At least one of the pair of the headlight units included in this headlight device includes an image forming section capable of forming an image in an optical path of the light of the light source, and is capable of illuminating a light for projecting the image onto the road surface.

Further, the second headlight control apparatus of the present invention forms an image in the image forming section of one of the pair of the headlight units selectively.

According to the second headlight control apparatus of the present invention, since one of the headlight units forms an image on the road surface selectively, it does not occur that boundary lines of two projected mages intersect with each other, and a user can easily recognize an image projected on the road surface.

BRIEF DESCRIPTION OF DRAWINGS

FIG. 2A is an explanatory view showing a combined light 101 illuminated from a headlight unit 3.

FIG. 2B is an explanatory view showing a combined light 105 illuminated from a headlight unit 5.

FIG. 2C is an explanatory view showing a state in which the combined light 101 and the combined light 105 are illuminated while being superimposed on each other.

FIG. 3A is an explanatory view showing a combined light 101 illuminated from a headlight unit 3.

FIG. 3B is an explanatory view showing a combined light 105 illuminated from a headlight unit 5.

FIG. 3C is an explanatory view showing a state in which the combined light 101 and the combined light 105 are illuminated while being superimposed on each other.

FIG. 4A is an explanatory view showing a combined light 101 illuminated from a headlight unit 3.

FIG. 4B is an explanatory view showing a combined light 105 illuminated from a headlight unit 5.

FIG. 4C is an explanatory view showing a state in which the combined light 101 and the combined light 105 are illuminated while being superimposed on each other.

DESCRIPTION OF EMBODIMENTS

Figure 1:
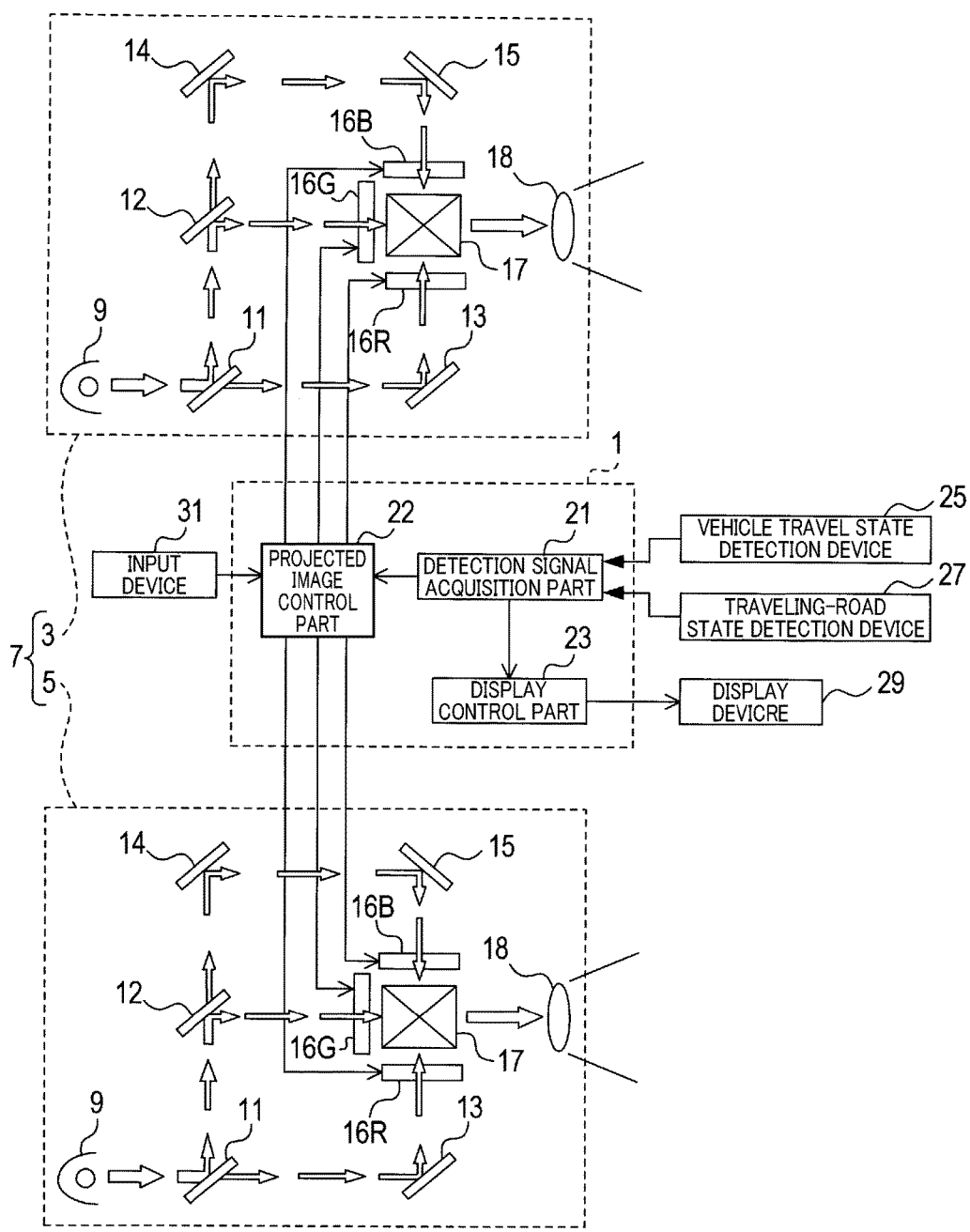
FIG. 1 is a block diagram showing the structure of a headlight control apparatus 1.

Embodiments of the present invention are explained based on the drawings.

<First Embodiment>

1. The Structures of a Headlight Control Apparatus 1 and a Headlight Device 7

The structures of the headlight control apparatus 1 and the headlight device 7 are explained based on FIG. 1. The headlight control apparatus 1 is a vehicle-mounted apparatus which performs control of the headlight device 7 including a pair of headlight units 3 and 5.

The headlight unit 3 is disposed on a position in the front end of a vehicle which is a little closer to the left side. The headlight unit 5 is disposed on a position in the front end of the vehicle which is a little closer to the right side. The headlight units 3 and 5 respectively illuminate a light forward of the vehicle. The headlight units 3 and 5 have the same structure. Here, the headlight unit 3 is explained as a representative example.

The headlight unit 3 includes a light source 9. As the light source 9, various known lamps used for a light source of vehicles such as a halogen lamp or a xenon lamp can be used. The light source 9 is controlled for on and off by the headlight control apparatus 1.

The headlight unit 3 has a similar structure to a projecting section of known transmissive liquid crystal projectors. That is, the headlight unit 3 includes a first dichroic mirror 11, a second dichroic mirror 12, a first mirror 13, a second mirror 14, a third mirror 15, a liquid crystal panel 16R for red, a liquid crystal panel 16G for green, a liquid crystal panel 16B for blue, a prism 17 and a projecting lens 18. In the following, some or all of the liquid crystal panel 16R for red, the liquid crystal panel 16G for green and the liquid crystal panel 16B for blue may be referred to as a liquid crystal panel 16.

The first dichroic mirror 11 is a mirror that receives the light from the light source 9 and reflects green and blue light and transmits red light. The second dichroic mirror 12 is a mirror that reflects green light and transmits red and blue light. This second dichroic mirror 12 is disposed so as to be opposed to the surface of reflection of the first dichroic mirror 11, so that a combination of the green light and the blue light enters from the first dichroic mirror 11.
The blue light is transmitted by the second dichroic mirror 12, and the green light is reflected in the direction in which the prism 17 is disposed.

The first mirror 13 totally reflects the light transmitting through the first dichroic mirror 11 (that is, the red light) in the direction in which the prism 17 is disposed. The second mirror 14 totally reflects the light transmitting through the second dichroic mirror 12 (that is, the blue light) in the direction in which the third mirror 15 is disposed. The third mirror 15 totally reflects the light from the second mirror 14 in the direction in which the prism 17 is disposed.

The liquid crystal panel 16R for red forms various images (optical images) by being controlled by the headlight control apparatus 1. This liquid crystal panel 16R for red is disposed between the first mirror 13 and the prism 17 (the light path of the light from the light source 9). The red light from the first mirror 13 transmits through the liquid crystal panel 16R, and accordingly the light for projecting a red image enters the prism 17.

Also, the liquid crystal panel 16G for green forms various images by being controlled by the headlight control apparatus 1. This liquid crystal panel 16G for green is disposed between the second dichroic mirror 12 and the prism 17 (the light path of the light from the light source 9). The green light from the second dichroic mirror 12 transmits through the liquid crystal panel 16G for green, and accordingly the light for projecting a green image enters the prism 17.

Also, the liquid crystal panel 16B for blue forms various images by being controlled by the headlight control apparatus 1. This liquid crystal panel 16B for blue is disposed between the third mirror 13 and the prism 17 (the light path of the light from the light source 9). The blue light from the third mirror 15 is transmitted through the liquid crystal panel 16B for blue, and accordingly the light for projecting a blue image enters the prism 17.

The prism 17 combines the light for projecting a red image, the light for projecting a blue image and the light for projecting a green image entering respectively from the liquid crystal panes 16R, 16G and 16B to form a combined image, to thereby form a combined light for projecting a combined image, and outputs this combined light in the direction in which the projecting lens 18 is disposed. When each of images formed in the respective liquid crystal panels 16 is a null image, a white image whose contour is defined by the frame of the liquid crystal panels 16 is formed as a projection image.

The projecting lens 18 enlarges the combined light from the prism 17 and illuminates it onto a road surface in front of the vehicle. As a result, the combined light in the prism 17 is enlarged and illuminated onto the road surface in front of the vehicle. The combined image in which the red image, blue image and green image are combined is projected onto the road surface. The combined light which the headlight unit 3 projects onto the road surface and the combined light which the headlight unit 5 projects onto the road surface are overlapped at least partially.

The headlight control apparatus 1 is a computer including a CPU, a ROM, a RAM and so on. The headlight control apparatus 1 functions as a detection signal acquisition part 21, a projected image control part 22 and a display control part 23 by the CPU executing programs stored in the ROM in advance while using a temporary storage function of the RAM.

The detection signal acquisition part 21 acquires detection signals from a vehicle travel state detection device 25 and a travelling road-state detection device 27 mounted on the vehicle. The vehicle travel state detection device 25 may include a vehicle speed detection device for detecting a vehicle speed, a brake sensor for detecting whether a foot brake is stepped on, an inclination angle detection device for detection an inclination angle in the longitudinal direction of a vehicle relative to a road surface, a shift position sensor for detecting a position of a shift lever, a steering angle sensor for detecting a steering angle of a steering wheel, a wireless door lock system for locking and unlocking vehicle doors through a wireless operation and a lamp-on time integration device for integrating an energization time of the light source 9.

The detection signal acquisition part 21 acquires, from the vehicle travel state detection device 25, a vehicle speed detection signal showing the vehicle speed, a brake detection signal showing the brake being stepped on, an inclination angle detection signal showing an inclination angle in the longitudinal direction of the vehicle relative to a road surface, a shift position signal showing a position of the shift lever, a steering angle signal showing a steering angle of the steering wheel, a door-lock release signal, an integrated energization time signal showing an integrated energization time of the light source 9, and a light turn-on signal showing the light source 9 being on.

The traveling road-state detection device 27 may include an object detection device for detecting an object in front of the vehicle (a traffic sign, an obstacle, for example), a slope detection device for detecting a slope of a travelling road, a curvature detection device for detecting a curvature of a traveling road, a traffic jam state detection device for detecting a traffic jam state of a traveling road, a vehicle camera for capturing an image in front of the vehicle, a weather detection device for detecting whether it is foggy at a travel position, a distance detection device for detecting a distance to an object in front of the vehicle, a vehicle-mounted rear camera for capturing an image behind the vehicle, a route guide device for detecting which point of which road the vehicle is running at, setting a proposed route and performing a route guidance in accordance with the proposed route.

As the object detection device, there may be mentioned a device of the type that outputs signal waves such as millimeter waves or a laser and receives its reflected version to detect an object. Alternatively, since an object can be detected also by analyzing images in front of the vehicle, a vehicle-mounted camera may be used as the object detection device. As the slope detection device, a three-dimensional acceleration sensor may be used.

As the curvature detection device, a steering wheel sensor for detecting a steering angle may be used. As the traffic jam state detection device, there may be used a device which detects the vehicle speed in succession, and detects a traffic jam state from a vehicle speed change pattern.

Since weather can be detected by analyzing images around the vehicle, the vehicle-mounted camera may be used as the weather detection device. Incidentally, information acquired by the weather detection device is used as a fog detection signal for determining whether the weather at the travel position is foggy. As the distance detection device, a device similar in structure to the obstacle detection device may be used.

The detection signal acquisition part 21 successively acquires from the traveling road-state detection device 27, an object detection signal showing the position or area of an obstacle in front of the vehicle, a slope detection signal showing the slope of the travelling road, a curvature detection signal showing the curvature of the traveling road, a traffic jam state detection signal showing a traffic jam state, a front image signal showing an image in front of the vehicle, a fog detection signal showing whether the weather at the traveling position is foggy, a signal showing a proposed route, a current position signal showing the current position of the vehicle, and a rear image signal showing an image behind the vehicle.

The detection signal acquisition part 21 may be configured to receive all the signals from the above described vehicle travel state detection device 25 and the traveling road-state detection device 27, or to receive only part of them.

The projected image control part 22 forms a red image, a green image and a blue image respectively in the liquid crystal panels 16R, 16G and 16B of the headlight units 3 and 5 based on the various detection signals acquired by the detection signal acquisition part 21. The images in the liquid crystal panels 16R, 16G and 16B are images each constituted of a bright part (part in which the light transmittance is high) and a dark part (a part in which the light transmittance is lower than the bright part).

Combinations of the detection signals acquired by the detection signal acquisition part 21 and the images formed in the liquid crystal panels 16R, 16G and 16B based on the detection signals include the followings. When the vehicle detection signal is acquired, a numerical image showing a vehicle speed is formed. When the brake detection signal is acquired, an image of characters or figures corresponding thereto is formed. When the inclination angle detection signal is acquired, an image of numerals showing an inclination angle is formed. When the shift position signal is acquired, an image of characters or figures showing a shift position is formed. When the steering angle signal is acquired, an image of numerals showing a steering angle is formed. When the door-lock release signal is acquired, an image of characters or figures corresponding thereto is formed. When the integrated energization time signal is acquired, an image of numerals showing an integrated energization time is formed. When the light turn-on signal is acquired, an image of characters or figures corresponding thereto is formed.

When the object detection signal is acquired, an image of characters or figures corresponding to an object is formed. When the slope detection signal is acquired, an image of numerals showing a slope is formed. When the curvature detection signal is acquired, an image of numerals showing a curvature is formed. When the traffic jam state signal is acquired, an image of characters or figures showing a traffic jam state is formed. When the rear image signal is acquired, an image which is the same as a front image (the size or tone may be different) is formed.

When the fog detection signal is acquired, an image of characters or figures corresponding thereto is formed. When the distance detection signal is acquired, an image of characters showing a distance is formed. When the signal showing a proposed route is acquired, an image of characters or figures showing the proposed route is formed. When the current position signal is acquired, an image of characters or figures showing the current position is formed. When the rear image signal is acquired, an image which is the same as a rear image (the size or tone may be different) is formed.

The projected image control part 22 forms, based on information inputted to an input device 31, a red image, a green image and a blue image associated to the content of the inputted information are formed respectively in the liquid crystal panels 16R, 16G and 16B of the headlight units 3 and 5.

The display control part 23 causes a display device 29 provided in the cabin to display a vehicle front image corresponding to the front image signal acquired by the detection signal acquisition part 21, which shows an image in front of the vehicle. The input device 29 is a touch panel attached to the display device 29, for example. The input device 29 may be a cross-key for shifting a position designation mark displayed on the display device 29.

When a combined image of a specific shape is projected onto a road surface using the headlight units 3 and 5, the projected image control part 22 forms different images in the liquid crystal panels 16R, 16G and 16B of the headlight unit 3 and in the liquid crystal panels 16R, 16G and 16B of the headlight unit 5.

That is, the projected image control part 22 forms an image of a specific shape in a large size in the liquid crystal panels 16R, 16G and 16B of the headlight unit 3. As a result, as shown in FIG. 2A, an image 103 of a specific shape is projected in a large size in the combined light 101 illuminated from the headlight control unit 3.

On the other hand, the projected image control part 22 forms an image of a specific shape in a small size compared to the case of the headlight control unit 3 in the liquid crystal panels 16R, 16G and 16B of the headlight unit 5. As a result, as shown in FIG. 2B, an image 107 of a specific shape is projected in a small size in the combined light 105 illuminated from the headlight control unit 3. The image 103 and the image 105 are similar in shape, the former being larger than the latter. The brightnesses of the insides of the image 103 and the image 107 are lower than their outsides.

As shown in FIG. 2C, the combined light 103 by the headlight unit 3 and the combined light 105 by the headlight unit 5 are illuminated on a road surface in front of the vehicle while being superimposed on each other. The image 107 is included in the image 103.

The liquid crystal panels 16R, 16G and 16B are one example of an image forming section. The image 103 is one example of a first image, and the image 107 is one example of a second image.

2. Advantages Provided by the Headlight Control Apparatus 1

According to the headlight control apparatus 1, since the image 103 includes the image 107 on a road surface, the boundary line separating between the inside and the outside of the image 103 and the boundary line 107A separating between the inside and the outside of the image 107 do not cross with each other. Therefore, a user can easily recognize the image 103 and the image 107 projected onto the road surface.

Further, since the inside of the image 107 is also the inside of the image 103, the brightness therein is particularly low. As a result, the contrast on the road surface can be made even higher.

<Second Embodiment>

1. The Structures of the Headlight Control Apparatus 1 and the Headlight Device 7

Basically, the structures of the headlight control apparatus 1 and the headlight device 7 are similar to the first embodiment. They differ partly from each other. The following explanation is provided with a focus on the differences.

When a combined image of a specific shape is projected onto a road surface using the headlight units 3 and 5, the projected image control part 22 forms different images in the liquid crystal panels 16R, 16G and 16B of the headlight unit 3 and in the liquid crystal panels 16R, 16G and 16B of the headlight unit 5.

That is, the projected image control part 22 forms an image of a specific shape in a large size in the liquid crystal panels 16R, 16G and 16B of the headlight unit 3. As a result, as shown in FIG. 3A, an image 109 of a specific shape is projected in a large size in the combined light 101 illuminated from the headlight control unit 3.

On the other hand, the projected image control part 22 forms a smaller image in the liquid crystal panels 16R, 16G and 16B of the headlight unit 5, which is different in shape from that in the case of the headlight unit 3. As a result, as shown in FIG. 3B, an image 111 which is different from the image 109 is projected in a small size in the combined light 105 illuminated from the headlight unit 3. The image 109 is larger than the image 111. The brightnesses of the insides of the image 103 and the image 111 are lower than their outsides.

As shown in FIG. 3C, the combined light 101 by the headlight unit 3 and the combined light 105 by the headlight unit 5 are illuminated on a road surface in front of the vehicle while being superimposed on each other. The image 111 is included in the image 109.

The image 109 is one example of the first image, and the image 111 is one example of the second image.

2. Advantages Provided by the Headlight Control Apparatus 1

According to the headlight control apparatus 1, since the image 109 includes the image 111 on a road surface, the boundary line 109A separating between the inside and the outside of the image 109 and the boundary line 111A separating between the inside and the outside of the image 111 do not cross with each other. Therefore, a user can easily recognize the image 109 and the image 111 projected onto the road surface.

Further, since the inside of the image 111 is also the inside of the image 109, the brightness therein is particularly low. As a result, the contrast on the road surface can be made even higher.

<Third Embodiment>

1. The Structures of the Headlight Control Apparatus 1 and the headlight device 7

Basically, the structures of the headlight control apparatus 1 and the headlight device 7 are similar to the first embodiment. They differ partly from each other. The following explanation is provided with a focus on the differences.

When a combined image of a specific shape is projected onto a road surface using the headlight units 3 and 5, the projected image control part 22 forms an image in the liquid crystal panels 16R, 16G and 16B of the headlight unit 5, but does not from an image in the liquid crystal panels 16R, 16G and 16B of the headlight unit 3.

That is, the projected image control part 22 does not form an image in the liquid crystal panels 16R, 16G and 16B of the headlight unit 3, so that the brightness within the combined light 101 illuminated from the headlight unit 3 is high at any spot as shown in FIG. 4A.

On the other hand, the projected image control part 22 forms an image of a specific shape in the liquid crystal panels 16R, 16G and 16B of the headlight unit 5. As a result, as shown in FIG. 4B, an image 113 of a specific shape is projected in the combined light 105 illuminated from the headlight control unit 3. The brightness of the inside of the image 113 is lower than its outside.

As shown in FIG. 4C, the combined light 101 by the headlight unit 3 and the combined light 105 by the headlight unit 5 are illuminated on a road surface in front of the vehicle while being superimposed on each other. The image 113 is projected onto the road surface in front of the vehicle.

2. Advantages Provided by the Headlight Control Apparatus 1

According to the headlight control apparatus 1, since the headlight unit 3 does not project an image, and the headlight unit 5 selectively projects the image 113 onto a road surface, it does not occur that the boundary lines of two projected images cross with each other, and accordingly a user can easily recognize the image 113 projected onto the road surface.

<Other Embodiments>

(1) In the first embodiment, it is possible that the image 107 is larger than the image 103, and the image 107 includes the image 103.

(2) In the second embodiment, the combination in shape of the image 109 and the image 111 can be set appropriately. For example, the image 109 may be an image of a circle, an ellipse, a triangle or a rectangle, and the image 111 may be an image of characters or numerals included in the image 109.

(3) In the third embodiment, it is possible that the headlight unit 3 forms an image and the headlight unit 5 does not form an image.

(4) In the first to third embodiments, the image formed on a road surface may be an image in which the inside is higher in brightness than the outside.

(5) In the first to third embodiments, the image to be formed in not limited to the ones described above, and can be selected appropriately. For example, as the image to be formed, there may be mentioned one which has a predetermined area, the brightness or tone within the area being different from that outside the area.

(6) All or parts of the structures of the first to third embodiments may be combined appropriately.

EXPLANATION OF REFERENCE SIGNS

1 . . . headlight control apparatus, 3, 5 . . . headlight unit, 7 . . . headlight device, 9 . . . light source, 11 . . . first dichroic mirror, 12 . . . second dichroic mirror, 13 . . . first mirror, 14 . . . second mirror, 15 . . . third mirror, 16B . . . liquid crystal panel for blue, 16G . . . liquid crystal panel for green, 16R . . . liquid crystal panel for red, 17 . . . prism, 18 . . . projecting lens, 21 . . . detection signal acquisition part, 21 . . . projected image control part, 23 . . . display control part, 25 . . . vehicle travel state detection device, 27 . . . traveling road-state detection device, 29 . . . display device, 31 . . . input device, 101, 105 . . . combined light, 107, 109, 111, 113 . . . image, 105 . . . combined light.

The invention claimed is:

1. A headlight control apparatus for performing control of a headlight device which includes a pair of headlight units each including a light source and an image forming section capable of forming an image and disposed in a light path of light from the light source to illuminate light for projecting the image onto a road surface, wherein the headlight control apparatus forms the image in the image forming section such that a first image projected onto the road surface by one of the headlight units encloses thereinside a second image projected onto the road surface by the other headlight unit to thereby cause a boundary line separating between an inside and an outside of the first image and a boundary line separating between an inside and an outside of the second image not to cross each other.

2. The headlight control apparatus according to claim 1, wherein the first image has a shape similar to the second image, and is larger than the second image.

3. The headlight control apparatus according to claim 1, wherein the first image has a shape different from the second image.

4. The headlight control apparatus according to claim 1, wherein insides of the first image and the second image projected onto the road surface are lower in brightness than outsides thereof.

\* \* \* \* \*